April 24, 1928.  A. G. McCALEB  1,667,559
WINDSHIELD CLEANER MOTOR
Filed July 11, 1924
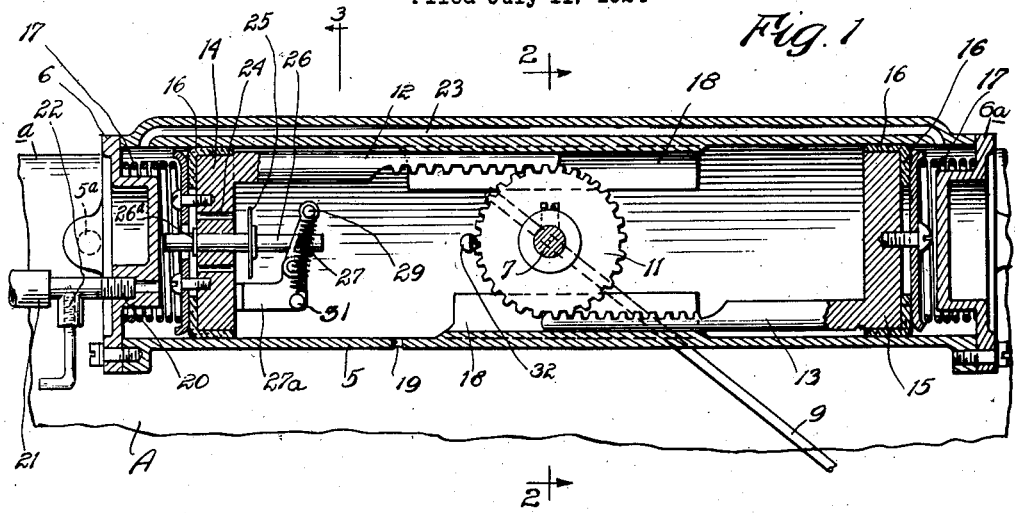
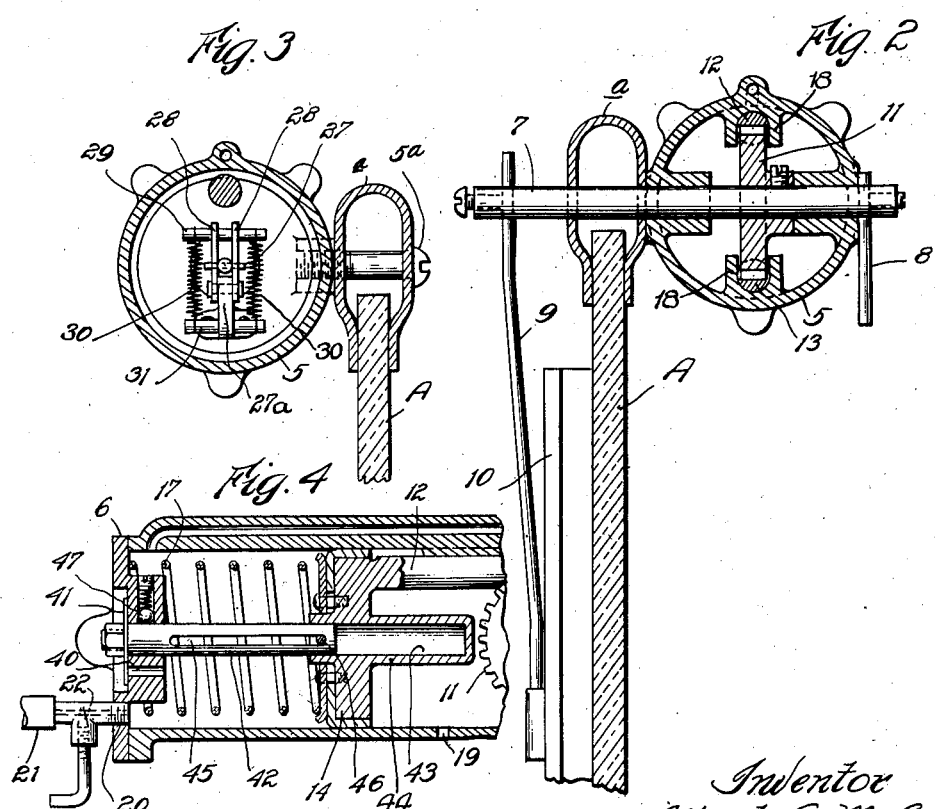
Inventor
Albert G. McCaleb
Williams, Bradbury, McCaleb & Hinkle
Attys Patented Apr. 24, 1928.

1,667,559

UNITED STATES PATENT OFFICE.

ALBERT G. McCALEB, OF CHICAGO, ILLINOIS, ASSIGNOR, BY MESNE ASSIGNMENTS, TO TRICO PRODUCTS CORPORATION, OF BUFFALO, NEW YORK, A CORPORATION OF NEW YORK.

WINDSHIELD-CLEANER MOTOR.

Application filed July 11, 1924. Serial No. 725,345.

My invention relates to a motor for windshield cleaners of the type operated by suction, such for instance as that existing within the intake manifold of the engine of an automotive vehicle with which the cleaner is associated.

It is the object of my invention to provide an improved motor of the type wherein the cleaner operating shaft is moved in one direction under the influence of engine suction and after the equalization of the pressures on the opposite sides of the piston and without disconnecting the source of suction is moved in the opposite direction under the influence of spring means in which energy is stored during the preceding movement of the cleaner shaft.

My present motor is chiefly characterized by the fact that it is capable of delivering considerably more power than prior art motors of corresponding size and type. This is a highly desirable characteristic because the suction within the intake manifold of an internal combustion engine varies within wide limits and is often quite low.

In the accompanying drawing illustrating my invention

Figure 1 is a vertical axial section of my improved motor, this view illustrating the motor mounted upon a windshield and in operative relation to a cleaner or squeegee;

Figure 2 is a vertical sectional view taken on the line 2—2 of Figure 1 and looking in the direction indicated by the arrows;

Figure 3 is a vertical sectional view taken on the line 3—3 of Figure 1 and looking in the direction indicated by the arrows; and Figure 4 is a fragmentary sectional view illustrating how my improved motor may be equipped with a modified form of valve mechanism.

Similar characters of reference refer to similar parts throughout the several views.

Referring to the drawings, reference letter A indicates an automobile windshield provided with the usual frame $a$. The cleaner motor of my invention is preferably mounted upon the windshield frame $a$.

The motor comprises a cylinder 5 provided with end closure plates 6 and 6$^a$ which are held in position in any suitable manner, as for instance by screws as illustrated. Extending transversely through the cylinder 5 at its central portion and journaled therein is a shaft 7 which is provided at one end with a small operating handle 8 by means of which the shaft may be manually operated if desired. The other end of the shaft extends freely through an opening in the windshield frame $a$ and carries the arm 9 of the usual windshield cleaner or squeegee 10 which oscillates back and forth across the outer surface of the windshield in an arcuate path when the cleaner motor operates. The cleaner motor is supported upon the windshield frame $a$ in any suitable manner, as for instance by screws 5$^a$ (one of which is shown) which extend through the windshield frame and are threaded into bosses formed integral with the closures 6 and 6$^a$.

Located within the cylinder 5 and rigidly fixed upon the shaft 7 is a spur pinion 11 which co-operates with each of a pair of racks 12 and 13. These racks respectively are carried by or formed integral with pistons 14 and 15 which are adapted simultaneously to move toward and away from each other within the cylinder 5. The pistons 14 and 15 have fluid-tight sliding fits in the cylinder 5 and for this purpose are equipped with the usual cup leathers 16 or their equivalent. Springs 17, located within the ends of the cylinder 5 and acting between the closure plates and the pistons, at all times tend to move the pistons toward each other. With the several parts of the motor in the positions illustrated in Figure 1, the springs 17 will move the pistons 14 and 15 toward each other, turning the pinion 11, shaft 7 and the cleaner or squeegee in a clockwise direction.

While the pistons 14 and 15 are free to reciprocate in the cylinder 5 they are effectively prevented from rotating within the cylinder by rack guides 18—18 which are formed on the inner surface of the cylinder and slidingly embrace the racks 12 and 13. An aperture 19 formed in the wall of the cylinder 5 at all times insures the existence of atmospheric pressure in the space between the pistons 14 and 15.

The closure plate 6 carries a hollow nipple 20 which communicates with the adjacent end of the cylinder 5. The nipple 20 is adapted to be connected by a suitable conduit, such as the rubber hose indicated at 21, with a source of suction such as the intake manifold of the engine of the vehicle by which the windshield cleaner is carried. Associated with the nipple 20 is a shut-off valve 22. Whenever this valve 22 is open such suction as exists within the intake manifold of the engine is applied to that end of the cylinder 5 adjacent the nipple. The pressures existing in the ends of the cylinder 5 are equalized by a passage 23 which, for clearness in illustration, is shown as being formed in the wall of the cylinder 5.

I shall now describe the valve mechanism which functions alternately to exclude atmospheric pressure from the ends of the cylinder 5 to permit the pistons 14 and 15 to move apart under the influence of engine suction and to open the ends of the cylinder to atmospheric pressure to permit the pistons to be moved toward each other under the influence of the springs 17.

The piston 14 has formed therein one or more ports 24 controlled by a disc valve 25 carried by a valve stem 26 which is mounted for reciprocating movement in the piston 14 to permit the valve 25 to open and close the pressure equalizing port or ports 24. This valve is alternately moved from an open position to a closed position by a snap action now to be described.

Near its inner end the valve stem 26 is provided with a cross pin 27 which engages in suitable slots in the members 28 of a snap-over arm which have their lower ends pivotally mounted upon a small bracket 27ª carried by the piston 14. The upper ends of the members 28 of the snap-over arm are connected by a relatively long cross pin 29 which projects laterally beyond the sides of the snap-over arm as is most clearly illustrated in Figure 3. Tension springs 30 act between the cross pin 29 and a fixed pin 31 carried by the bracket 27, the pin 31 being located a substantial distance below the pivot of the snap-over arm. Carried by the cylinder 5 and located in the path of the valve stem 26 is an abutment which may be in the form of a fixed pin 32 extending across the cylinder at a point adjacent to the pinion 11.

Assuming the engine to be running, the shut-off valve 22 to be open and the several parts of the cleaner motor in the positions illustrated in Figures 1 to 3, the operation of the motor is as follows:

The port or ports 24 being open, no suction exists within the ends of the cylinder 5 to hold the pistons 14 and 15 apart in opposition to the pressure of springs 17—17. Consequently the pistons simultaneously move toward each other, the racks 12 and 13 cooperating with the pinion 11 to turn the shaft 7 and the cleaner or squeegee in a clockwise direction (Figure 1). Shortly before the shaft 7 has been through a suitable arc of say 120° from the position illustrated in Figure 1, the valve stem 26 engages the pin 32. Inward movement of the piston 14 following engagement of the valve stem 26 with the pin 32 causes the snap-over arm to be swung toward the piston 14. As soon as the line between the pins 29 and 31 passes to the left of the snap-over arm pivot the springs 30 function quickly to move the stem 26 and valve 25 toward the piston 14 to close the port or ports 24. The suction of the engine manifold now creates a partial vacuum within the ends of the cylinder 5, whereupon the pistons 14 and 15 move apart under the pressure of the atmosphere, the springs 17 being compressed as the pistons move apart. The outward movement of the pistons causes the shaft 17 and its cleaner arm to be moved in a counter-clockwise direction (Figure 1). As the piston 14 approaches the limit of its outward movement the valve stem 26 engages the closure plate 6. Further outward movement of the piston 14 causes the snap-over arm to function to shift the valve 25 away from the piston 14 and to open the port or ports 24, the snap-over arm assuming the position illustrated in Figure 1 and holding the shoulder 26ª of the valve stem 26 against the piston 14. As soon as the port or ports 24 are open the partial vacuum existing in the ends of the cylinder 5 is quickly dissipated, whereupon the springs 17 quickly move the pistons 14 and 15 toward each other to be separated again under the influence of engine suction, as previously described, after the valve 25 has been operated again to close the port or ports 24.

The modification of my invention illustrated in Figure 4 differs from the construction illustrated in the preceding figures in that the port which is opened to dissipate the partial vacuum in the ends of the cylinder is located in the closure plate 6, said port being indicated by reference numeral 40. Port 40 is controlled by a disc valve 41 mounted upon a valve stem 42 which extends freely through the closure plate 6 and projects into a passage 43 formed in the piston 14, the piston being provided with a boss 44 to permit the formation of the elongated passage 43. Valve stem 42 is provided with an elongated slot 45 through which passes a fixed cross pin 46 carried by the boss 44 of the piston 14. A spring pressed ball 47 carried by the end closure 6 at all times bears lightly against the valve stem 42 and tends to hold it in any position to which it may be moved.

The operation of the motor illustrated in Figure 4 differs only in the operation of its valve mechanism from the motor shown in the preceding figures. In the motor of Figure 4 the piston 14 is shown at its innermost position, the pin 46 engaging the valve stem 42 and holding the valve 41 in position to close the port 40. After the pistons have moved apart under the influence of engine suction to such an extent that the valve stem 42 engages the blind end of the passage 43, the valve 41 uncovers the port 40 and is held in open position by the spring pressed ball 47 which bears against the valve stem 42. As soon as the partial vacuum in the ends of the cylinder 5 is dissipated by the inflow of air through the port 40 the pistons move together under the pressure of the springs 17 until the pin 46 comes to the right end of the slot 45 and the valve stem 42. When this occurs the valve 41 is moved to close the port 40.

Thereafter the pistons are moved apart by the partial vacuum created in the ends of the cylinder 5 and the operation just described is repeated.

Having thus illustrated two practical embodiments of my invention what I claim as new and desire to secure by United States Letters Patent is:

1. An automatic windshield cleaner motor comprising a cylinder element; a piston element therein; one of the aforesaid elements being movable relative to the other; a suction passage for establishing continuous and uninterrupted communication between the interior of the cylinder at one side of the piston and a source of suction, when the motor is operating, for effecting movement of the movable one of said first two named elements in one direction, the interior of the cylinder at the opposite side of the piston being opened to the atmosphere; means for moving said movable element in the opposite direction when the pressures on the opposite sides of the piston are substantially equalized; and valve means including a snap action carried by the piston and operable by and during movement of said movable element for substantially equalizing the pressures on the opposite sides of the piston and without interrupting the continuous communication through the suction passage.

2. A windshield cleaner motor comprising a cylinder, a pair of pistons movable toward and away from each other therein, a wiper actuating shaft arranged between the pistons and operable thereby, the space within the cylinder and between the pistons being open to the atmosphere, means for continuously connecting the opposite ends of the cylinder to a source of suction for creating partial vacuums in the ends of the cylinder and for permitting atmospheric pressure between the pistons to drive them apart, means operable at intervals for dissipating the partial vacuum established in the ends of the cylinder, and mechanical means for driving the pistons toward each other during the intervals of operation of said dissipating means.

3. A fluid pressure motor for windshield cleaners, comprising a cylinder, a pair of pistons movable toward and from each other therein, a wiper actuating shaft journaled between and operable by the pistons, a pressure equalizing passage connecting the ends of the cylinder, means for continuously connecting one end of the cylinder to a source of suction tending to draw the pistons apart, means acting at intervals for dissipating the partial vacuum created in the opposite ends of the cylinder by the source of suction to the space between the pistons, and resilient means acting during said intervals to move the pistons toward each other.

4. A windshield cleaner motor comprising a cylinder, a pair of pistons movable toward and from each other therein, a wiper actuating shaft journaled between the pistons and operable thereby, the space between the pistons being open to the atmosphere, resilient means interposed between each piston and the adjacent end of the cylinder for urging the pistons toward each other, means for establishing uninterrupted communication between a source of suction and the opposite ends of the cylinder for exerting a separating force on the pistons, one of said pistons having a port therethrough, a valve stem slidably carried by the ported piston and extending to opposite sides thereof for alternately engaging fixed parts in the cylinder, a valve operable by said stem to open and close the piston port by and during movement of the piston to respectively disrupt and permit the creation of partial vacuums in the opposite ends of the cylinder whereby said resilient means may function without disconnecting the source of suction.

5. A windshield cleaner motor comprising a cylinder, a wiper actuating shaft journaled therein, a pair of pistons connected to reciprocate first toward each other and then to reciprocate away from each other within the cylinder for operating the shaft, said shaft being journaled in the space between the pistons which space is open to the atmosphere, means for establishing uninterrupted communication between the ends of the cylinder and a source of suction for imparting one reciprocative movement to the pistons, one of said pistons having a port opening into the space between the pistons, automatic valve mechanism carried by the ported piston for rendering the source of suction alternately effective and ineffective on the pistons without disconnecting the same from the cylinder, and mechanical means for imparting the other reciprocative movement to the pistons when the source of suction is ineffective.

6. A windshield cleaner comprising a cylinder, a wiper actuating shaft, a piston movable in the cylinder for operating the shaft, means for continuously connecting one end of the cylinder to a source of suction for creating a partial vacuum on one side of the piston, the opposite side of the piston being subjected to atmospheric pressure for moving the piston in one direction, said piston being ported for permitting the equalization of fluid pressure on opposite sides thereof, automatic valve mechanism for alternately closing and opening the piston port whereby the partial vacuum will be created on said one side of the piston when the piston port is closed and the partial vacuum will be dissipated when said piston port is opened, and mechanical means for moving the piston in the opposite direction when the partial vacuum has been dissipated.

7. A windshield cleaner comprising a cylinder, a piston therein, a wiper actuating shaft operable by the piston, means for constantly connecting the cylinder to a source of suction for creating a partial vacuum on one side of the piston, the opposite side of the piston being open to atmospheric pressure whereby the piston is moved in the direction of the partial vacuum, said piston having a port for equalizing pressures on opposite sides thereof, a valve controlling the piston port to open and close communication between the portions of the cylinder on opposite sides of the piston whereby a partial vacuum will first be formed on one side thereof and then dissipated, means operable at the opposite limits of travel of the piston for respectively seating and unseating the valve, and a spring interposed between the piston and a fixed part of the cylinder for moving the piston toward the atmospheric pressure side when the valve is unseated.

8. A windshield cleaner motor comprising a cylinder having an open suction port connectible to a source of suction, a wiper actuating shaft, a piston movable in the cylinder for operating the shaft, the side of the piston opposite the suction port being open to the atmosphere whereby the piston will move toward the suction side thereof, said piston being provided with a pressure equalizing port therethrough, a valve for closing the piston port, a valve shifting member slidable through the piston and projecting from either side thereof to engage fixed parts adjacent the limits of travel of the piston for shifting the valve respectively from or to its operative position by and during movement of the piston, spring snap-over mechanism carried by the piston for insuring such shifting movements of the valve, and means for moving the piston toward the atmospheric side thereof when the valve is unseated.

9. An automatic windshield cleaner motor comprising a cylinder, a piston therein, spring means for urging the piston toward one end of the cylinder, a suction passage adapted to establish continuous and uninterrupted communication between a source of suction and the opposite end of said cylinder, said first end of the cylinder being open to the atmosphere, a passage adapted to connect said opposite end of the cylinder to atmospheric pressure, and valve means including a snap action carried by the piston and operable by and during movement of said piston, said snap action having a part adapted to come in contact with a fixed part of the cylinder for closing said second passage when the piston nears the end of its spring-urged movement, and for opening said second passage when the piston approaches the end of its suction-operated movement.

In witness whereof, I hereunto subscribe my name this 5th day of July, 1924.

ALBERT G. McCALEB.